United States Patent
Skinner et al.

(10) Patent No.: US 6,281,179 B1
(45) Date of Patent: *Aug. 28, 2001

(54) PROCESS FOR PREPARING AN OVERBASED METAL-CONTAINING DETERGENTS

(75) Inventors: Philip Skinner, Oxfordshire (GB); Alain Louis Pierre Lenack, Rouen (FR)

(73) Assignee: Infineum USA L.P., Linden, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/180,438

(22) PCT Filed: May 16, 1997

(86) PCT No.: PCT/EP97/02698

§ 371 Date: Nov. 9, 1998

§ 102(e) Date: Nov. 9, 1998

(87) PCT Pub. No.: WO97/46646

PCT Pub. Date: Dec. 11, 1997

(30) Foreign Application Priority Data

May 31, 1996 (GB) .................................................. 9611316

(51) Int. Cl.$^7$ .................................................. C11D 17/00
(52) U.S. Cl. .......................... 510/184; 510/185; 510/488; 510/492; 134/40
(58) Field of Search ..................................... 510/488, 492; 252/184–185, 32, 33, 33.2, 25, 42.7, 18; 134/40

(56) References Cited

U.S. PATENT DOCUMENTS

| 3,372,116 | | 3/1968 | Meinhardt . | |
| 3,544,463 | * | 12/1970 | Koft | 252/40.7 |
| 5,441,652 | * | 8/1995 | O'Connor et al. | 252/18 |
| 5,602,084 | * | 11/1997 | Moreton | 508/391 |

FOREIGN PATENT DOCUMENTS

| 0347103 | * | 6/1989 | (EP) . |
| 0 347 103 | | 12/1989 | (EP) . |
| 0 354 647 | | 2/1990 | (EP) . |
| 0 416 757 | | 3/1991 | (EP) . |
| 1 198 357 | | 7/1970 | (GB) . |
| 1 233 327 | | 5/1971 | (GB) . |
| WO 95 16011 | | 6/1995 | (WO) . |

* cited by examiner

Primary Examiner—Necholus Ogden

(57) ABSTRACT

A method of manufacturing a calcium overbased detergent, of TBN at least 300, from at least two surfactants, at least one of which is a phenol surfactant or a salicylic acid surfactant. Overbasing is carried out in at least two steps, at a temperature of less than 100° C., at least one of the overbasing steps being followed by a heat-soaking step. The overbased detergents produced may be useful marine diesel lubricant additives.

36 Claims, No Drawings

PROCESS FOR PREPARING AN OVERBASED METAL-CONTAINING DETERGENTS

This invention relates to a method of manufacturing compositions suitable, inter alia, as lubricant additives, and especially to calcium overbased detergents, and more especially to such materials suitable for use as additives to lubricants for use in marine engines.

To meet intense pressures on capital, maintenance, and running costs, marine engine manufacturers are producing new engines designed to minimize fuel and lubricant consumption, and are placing heavy demands on suppliers to provide lubricants that reduce wear and extend the period between overhauls. There is a continuing need for lubricant additives that provide detergency, antioxidant properties, and rust protection, and that neutralize corrosive acids from sulphur-containing fuels. Overbased detergents are uniquely able to fulfil all of these necessary roles.

Lubricant formulators are, as a result of the requirements placed on them by engine manufacturers and users, in turn seeking higher total base number (TBN) overbased detergents, in order to reduce the treat rate while maintaining effectiveness. (In this specification, the TBN of an overbased detergent is the TBN, in mg KOH/g, as measured by ASTM D2896.) There is also a need for products which, while being highly effective as additives, can be more cost-effective than existing products, and which are relatively easy to prepare and to handle.

Overbased metal-containing detergents suitable for use as lubricant additives are typically prepared as concentrates in oil. In such concentrates, a basic metal-containing material is maintained in dispersion or solution in the oil by a surfactant system comprising, for example, phenate, salicylate, sulphonate or naphthenate anions.

Overbased detergents initially contained a single type of anion, for example a member or members of the phenate group, or of the sulphonate group, but for many years compositions have been available that contain anions of two or more such groups, obtained either by adding two or more overbased detergents having different types of anion or by the manufacture of a hybrid material in which two or more anions of different groups are incorporated during the overbasing process. As basic materials, compounds of members of the alkali and alkaline earth groups are used, compounds of calcium being most frequently employed.

For a number of applications, for example, for lubricants for use in marine engines, it may in some cases be desirable, for maximum effectiveness, that overbased detergents contain a relatively high proportion of phenate and/or salicylate anions. Such overbased detergents may also be useful in other applications.

The present invention provides a method of manufacturing a calcium overbased detergent having a surfactant system derived from at least two surfactants, which method comprises:
(A) treating with an overbasing agent (as hereinafter defined) a mixture comprising (a), (b) and (c), wherein (a) is selected from (a1) and (a2):
  (a1) at least two surfactants, at least one of the surfactants being a sulphurized or non-sulphurized phenol or a derivative thereof and the other, or at least one other, of the surfactants being a surfactant other than a phenol surfactant;
  (a2) at least two surfactants, at least one of the surfactants being a sulphurized or non-sulphurized salicylic acid or a derivative thereof and the other, or at least one other, of the surfactants being a surfactant other than a salicylic acid surfactant;
(b) at least one basic calcium compound; and
(c) oil,
the treatment with the overbasing agent being carried out at less than 100° C.;
(B) subjecting the product of (A) to a heat-soaking step;
(C) adding a further quantity of basic calcium compound(s) to the product of
(B), and treating the mixture so obtained with an overbasing agent, the said treatment being carried out at less than 100° C.; and
(D) subjecting the product of (C) to a heat-soaking step;
either step (B) or step (D) being optional, but both step (B) and step (D) preferably being included, and the mass ratios of all the components being such as to produce an overbased detergent having a TBN of at least 300.

By a "calcium overbased detergent" is meant an overbased detergent in which the metal cations of the basic metal-containing material are essentially calcium cations. Small amounts of other cations may be present in the basic metal-containing material, but typically at least 80 mole %, more typically at least 90 mole %, for example at least 95 mole %, of the cations in the basic metal-containing material, are calcium ions. Cations other than calcium may be derived, for example, from the use in the manufacture of the overbased detergent of a surfactant salt in which the cation is a metal other than calcium.

The percentage of surfactant in the overbased detergent, and the percentages of the individual surfactants, for example, phenol, in the surfactant system, are the percentages measured by the method set out below, which also indicates how the "standardized TBN" of an overbased detergent is determined.

1. Dialysis of the overbased detergent and determination of standardized TBN

A known amount (A g, approximately 20 g) of the liquid overbased detergent (substantially free from other lubricating oil additives) is dialysed through a membrane in a Soxhlet extractor (150 mm height×75 mm internal diameter) using n-hexane siphoning at a rate of 3 to 4 times per hour for 20 hours. The membrane should be one which retains substantially all the metal-containing material, and passes substantially all the remainder of the sample. An example of a suitable membrane is a gum rubber membrane supplied by Carters Products, Division of Carter Wallace Inc., New York, N.Y. 10105 under the trade name Trojans. The dialysate and residue obtained on completion of the dialysis step are evaporated to dryness, any remaining volatile material then being removed in a vacuum oven (100° C. at less than 1 torr or less than about 130 Pa). The mass of the dried residue, in grams, is designated B. The percentage (C) of overbased detergent material in the liquid sample is given by the equation:

$$C = \frac{B}{A} \times 100\%$$

The "standardized TBN" of the overbased detergent (that is, the TBN expressed in a manner which is independent of the amount of diluent) is the TBN measured according to ASTM D2896 on the dried residue.

Background information for the dialysis technique is given by Amos, R. and Albaugh, E. W. in "Chromatography in Petroleum Analysis", Altgelt, K. H. and Gouw, T. H., Eds, pages 417 to 422, Marcel Dekker, Inc., New York and Basel, 1979.

2. Determination of TBN: % total surfactant ratio

A known amount (D g, approximately 10 g) of the dried residue is hydrolyzed as specified in sections 8.1 to 8.1.2 of ASTM D3712, except that at least 200 ml of 25% by volume hydrochloric acid (sp. gr. 1.18) is used in section 8.1.1. The amount of hydrochloric acid used should be sufficient to effect acidification/hydrolysis of the overbased detergent residue into organic materials (surfactants) and inorganic materials (calcium-containing materials, for example, calcium chloride). The combined ether extracts are dried by passing them through anhydrous sodium sulphate. The sodium sulphate is rinsed with clean ether, and the combined ether solutions are evaporated to dryness (at approximately 110° C.) to yield a hydrolyzed residue. The mass of the dried hydrolyzed residue, in grams, is designated E.

The percentage, Y, of total surfactants in the original liquid overbased detergent is given by the equation $$Y = \frac{E}{D} \times C$$

and the TBN: % total surfactant ratio, X, is given by the equation $$X = \frac{\text{TBN of the liquid overbased detergent}}{Y}$$

It will be noted that, in determining X, the mass of the surfactants in their free form (that is, not in the form of a salt or other derivative) is used. For brevity, X will in general be referred to herein as the "TBN:% surfactant ratio", and it is the value of X that is specified under this term in the claims and elsewhere in this specification.

3. Determination of Individual Surfactants (in their free form) in the Surfactant System The techniques described below isolate the individual surfactants, in hydrolyzed form, from the hydrolyzed surfactant mixture derived from the overbased detergent. As indicated below, the proportion of each individual surfactant is the proportion by mass of the individual surfactant, in hydrolyzed form, in the hydrolyzed surfactant mixture. Thus, where, for example, the overbased detergent contains a calcium phenate/sulphonate/salicylate surfactant system, the proportions of the individual surfactants in the surfactant system are expressed as the proportions of phenol, sulphonic acid and salicylic acid respectively.

The proportions of individual surfactants may be determined by the following method.

A known amount (F g, approximately 1 g) of the dried hydrolyzed residue obtained as described above is placed at the top of a 450×25 mm (internal diameter) fritted glass column filled with 60–100 US mesh Florisil. Florisil is magnesium silicate with a CAS number of 8014-97-9. The column is eluted with a 250 ml portion of each of seven solvents of increasing polarity, namely, heptane, cyclohexane, toluene, ethyl ether, acetone, methanol, and, lastly, a mixture of 50 volume % chloroform, 44 volume % isopropanol, and 6 volume % ammonia solution (sp. gr. 0.88). Each fraction is collected, evaporated to dryness, and the resulting residue is weighed and then analyzed to determine the amount ($G^1$, $G^2$, $G^3$ . . . g) and nature of the surfactant(s) contained in the fraction.

Analysis of the fractions (or of the hydrolyzed residue) can be carried out by, for example, chromatographic, spectroscopic, and/or titration (colour indicator or potentiometric) techniques known to those skilled in the art. Where the overbased detergent contains a sulphonate surfactant and a salicylate surfactant, the sulphonic acid and salicylic acid obtained by hydrolysis of these surfactants will usually be eluted from the column together. In this case, and in any other case where it is necessary to determine the proportion of sulphonic acid in a mixture containing it, the proportion of sulphonic acid in the mixture can be determined by the method described by Epton in Trans.Far.Soc. Apr. 1948, 226.

In the above method, the mass (in grams, designated $H^1$) of a given surfactant, in hydrolyzed form, is determined from the fraction(s) containing it, and thus the proportion of that surfactant in the surfactant system of the original overbased detergent is $$\frac{H^1}{F} \times 100\%$$

The percentages (by mass) of the individual surfactants (in their free form, that is, not in the form of a salt or other derivative) based on the surfactant system can be predicted from the proportions of the surfactants used as starting materials, provided that the percentage of "reactive ingredient" is known for each of the surfactant starting materials. (The term "reactive ingredient" is defined in Note 1 to Tables 1 and 2 in the Examples in this specification.) The percentage of the total surfactants (in their free form) in the liquid overbased product can then be predicted, and the TBN:% surfactant ratio can be determined. Further, the standardized TBN can be predicted, provided that the proportion of the overbased detergent material in the liquid overbased product (that is, the proportion of the liquid overbased product that is not oil or non-reactive surfactant material) is known.

Good correlation has been found between predicted values and values measured as described above.

The overbased detergents obtained according to the invention are hybrid overbased detergents, that is, overbased detergents obtained by overbasing a mixture containing two or more surfactants. At least one of the surfactants in a mixture to be overbased may be present in a previously prepared overbased detergent.

It will be appreciated that the mixture to be overbased contains free basic calcium compound(s), that is, basic calcium compound(s) which is/are available to react with the overbasing agent. By an "overbasing agent" is meant an agent or compound capable of reacting with the basic calcium compound (b) to form a basic calcium-containing material which can be maintained in dispersion or solution in the oil by the surfactant system. Where there is more than one overbasing step, different overbasing agents may, if desired, be used for the different steps. In any individual overbasing step, a mixture of different overbasing agents may, if desired, be used.

Examples of suitable overbasing agents are carbon dioxide, a source of boron, for example, boric acid, sulphur dioxide, hydrogen sulphide, and ammonia. Preferred overbasing agents are carbon dioxide or boric acid, or a mixture of the two. The most preferred overbasing agent is carbon dioxide and, for convenience, the treatment with overbasing agent will in general be referred to as "carbonation". Unless the context clearly requires otherwise, it will be understood that references herein to carbonation include references to treatment with other overbasing agents.

Advantageously, on completion of the carbonation step (s), part of the basic calcium compound(s) (b) remains uncarbonated. Advantageously, up to 15 mass % of the basic calcium compound(s) remains uncarbonated, especially up to 11 mass %.

As indicated above, carbonation is effected at less than 100° C. Typically the carbonation is effected at at least 150° C., preferably at least 25° C. Advantageously, carbonation is carried out at less than 80° C., more advantageously less than 60° C., preferably at most 50° C., more preferably at most 40° C., and especially at most 35° C. Advantageously, the temperature is maintained substantially constant during the or each carbonation step, with only minor fluctuations. Where there is more than one carbonation step, both or all carbonation steps are preferably carried out at substantially the same temperature, although different temperatures may be used, if desired, provided that each step is carried out at less than 100° C.

Carbonation may be effected at atmospheric, super-atmospheric or sub-atmospheric pressures. Preferably, carbonation is carried out at atmospheric pressure.

Advantageously, the first carbonation step (and preferably also the second or each subsequent carbonation step, if used) is followed by a "heat-soaking" step in which the mixture is maintained, without addition of any further chemical reagents, in a selected temperature range (or at a selected temperature), which is normally higher than the temperature at which carbonation is effected, for a period before any further processing steps are carried out. The mixture is normally stirred during heat-soaking. Typically, heat-soaking may be carried out for a period of at least 30 minutes, advantageously at least 45 minutes, preferably at least 60 minutes, especially at least 90 minutes. Temperatures at which heat-soaking may be carried out are typically in the range of from 15° C. to just below the reflux temperature of the reaction mixture, preferably 25° C. to 60° C.: the temperature should be such that substantially no materials (for example, solvents) are removed from the system during the heat-soaking step. We have found that heat-soaking has the effect of assisting product stabilization, dissolution of solids, and filtrability.

Preferably, following the first carbonation step (and the heat-soaking step, if used), a further quantity of basic calcium compound (component (b)) is added to the mixture and the mixture is again carbonated, the second carbonation step advantageously being followed by a heat-soaking step.

Products of reduced viscosity may be obtained by employing one or more further additions of basic calcium compound and subsequent carbonation, each carbonation step advantageously being followed by a heat-soaking step. This is one important aspect of the present invention. Further, we have found that products of higher TBN, and higher TBN:% surfactant ratio, with convenient viscosities, may be obtained by the use of the steps mentioned in this paragraph. In each case, comparison is made with the product resulting from treatment in fewer steps with the same quantity of the basic calcium compound and of the overbasing agent.

Basic calcium compounds for use in manufacture of the overbased detergents include calcium oxide, hydroxide, alkoxides, and carboxylates. Calcium oxide and, more especially, hydroxide are preferably used. A mixture of basic compounds may be used, if desired.

The mixture to be overbased by the overbasing agents should normally contain water, and may also contain one or more solvents, promoters or other substances commonly used in overbasing processes.

Examples of suitable solvents are aromatic solvents, for example, benzene, alkyl-substituted benzenes, for example, toluene or xylene, halogen-substituted benzenes, and lower alcohols (with up to 8 carbon atoms). Preferred solvents are toluene and/or methanol. The amount of toluene used is advantageously such that the percentage by mass of toluene, based on the calcium overbased detergent (excluding oil) is at least 1.5, preferably at least 15, more preferably at least 45, especially at least 60, more especially at least 90. For practical/economic reasons, the said percentage of toluene is typically at most 1200, advantageously at most 600, preferably at most 500, especially at most 150. The amount of methanol used is advantageously such that the percentage by mass of methanol, based on the calcium detergent (excluding oil) is at least 1.5, preferably at least 15, more preferably at least 30, especially at least 45, more especially at least 50. For practical/economic reasons, the said percentage of methanol (as solvent) is typically at most 800, advantageously at most 400, preferably at most 200, especially at most 100. The above percentages apply whether the toluene and methanol are used together or separately.

Preferred promoters for use in accordance with the invention are methanol and water. The amount of methanol used is advantageously such that the percentage by mass of methanol, based on the initial charge of basic calcium compound(s), for example, calcium hydroxide (that is, excluding any basic calcium compound(s) added in a second or subsequent step) is at least 6, preferably at least 60, more preferably at least 120, especially at least 180, more especially at least 210. For practical/economic reasons, the said percentage of methanol (as promoter) is typically at most 3200, advantageously at most 1600, preferably at most 800, especially at most 400. The amount of water in the initial reaction mixture (prior to treatment with the overbasing agent) is advantageously such that the percentage by mass of water, based on the initial charge of basic calcium compound(s), for example, calcium hydroxide, (that is, excluding any basic calcium compound(s) added in a second or subsequent step) is at least 0.1, preferably at least 1, more preferably at least 3, especially at least 6, more especially at least 12, particularly at least 20. For practical/economic reasons, the said percentage of water is typically at most 320, advantageously at most 160, preferably at most 80, especially at most 40. If reactants used are not anhydrous, the proportion of water in the reaction mixture should take account of any water in the components and also water formed by neutralization of the surfactants. In particular, allowance must be made for any water present in the surfactants themselves.

Advantageously, the reaction medium comprises methanol, water (at least part of which may be generated during salt formation), and toluene.

If desired, low molecular weight carboxylic acids (with 1 to about 7 carbon atoms), for example, formic acid, inorganic halides, or ammonium compounds may be used to facilitate carbonation, to improve filtrability, or as viscosity agents for overbased detergents. The process of the invention does not, however, require the use of an inorganic halide or ammonium salt catalyst, for example, ammonium salts of lower carboxylic acids or of alcohols, and the overbased detergents produced are thus preferably free from groups derived from such a halide or ammonium catalyst. (Where an inorganic halide or ammonium salt is used in an overbasing process the catalyst will normally be present in the final overbased detergent.) Further, the process of the invention does not require the use of reagents such as dihydric alcohols (for example, ethylene glycol) which are used when operating at higher temperatures; the overbased detergents produced are thus preferably free from such dihydric alcohols or residues thereof.

The invention also provides overbased detergents prepared by the method of the invention, concentrates comprising such detergents, and oil-based compositions, particularly lubricating oils, especially lubricating oils for marine use, comprising an overbased detergent prepared according to the invention.

For ease of handling, an overbased detergent prepared in accordance with the invention, advantageously has a $KV_{40}$ of at most 20,000 mm$^2$/s preferably at most 10,000 mm$^2$/s, especially at most 5,000 mm$^2$/s, and a $KV_{100}$ of at most 2,000 mm$^2$/s, preferably at most 1,000 mm$^2$/s, especially at most 500 mm$^2$/s. Throughout this specification, viscosities are measured in accordance with ASTM D445.

Overbased detergents prepared according to the invention advantageously have a TBN of at least 330, preferably at least 350, and more preferably at least 400, especially at least 450. As indicated later in this specification, an important aspect of the present invention is the provision of high TBN overbased detergents of acceptable viscosity and which if desired contain a relatively high proportion of phenate and/or salicylate surfactants in the surfactant system.

The invention also makes possible the preparation of overbased detergents with high standardized TBNs (as defined herein). Thus, for example, the overbased detergents prepared may have a standardized TBN of 450 or more, especially 460 or more, advantageously at least 500, more advantageously at least 550, preferably at least 600, more preferably at least 650.

The TBN:% surfactant ratio is an indication of the amount of (relatively expensive) surfactant required to prepare an overbased detergent of a specified TBN. The overbased detergents prepared in accordance with the invention advantageously have a TBN:% surfactant ratio of at least 11. More advantageously, the said ratio is at least 12, preferably at least 13, more preferably at least 14, especially at least 16, more especially at least 19, particularly at least 21. With appropriate starting materials/reaction conditions, ratios of up to 25 or more, such as 30 or more, for example 35 or more, or 40 or more, may be obtained.

Surfactants from which the surfactant system of the overbased detergents prepared according to the invention are derivable or derived preferably contain at least one hydrocarbyl group, for example, as a substituent on an aromatic ring. The term "hydrocarbyl" as used herein means that the group concerned is primarily composed of hydrogen and carbon atoms but does not exclude the presence of other atoms or groups in a proportion insufficient to detract from the substantially hydrocarbon characteristics of the group. Advantageously, hydrocarbyl groups in surfactants for use in accordance with the invention are aliphatic groups, preferably alkyl or alkylene groups, especially alkyl groups, which may be linear or branched. The total number of carbon atoms in the surfactants should be sufficient to impart the desired oil-solubility.

When preparing overbased detergents in accordance with the invention one or more of the surfactants may, if desired, be used in the form of a derivative thereof, provided that the derivative, if other than a metal salt, can react with the basic calcium compound(s) (b) to form a calcium salt of the surfactant. Unless this is clearly inappropriate in the context, references in the following discussion of individual surfactants, and elsewhere in this specification, to surfactants in their "free" (non-salted) form include references to appropriate derivatives of those surfactants. Examples of suitable derivatives of certain of the preferred surfactants are: ammonium salts, metal salts or esters of phenols; ammonium salts, metal salts, esters, anhydrides, acid chlorides or amides of salicylic acids; ammonium salts, metal salts, esters, anhydrides, acid chlorides or amides of carboxylic acids; and ammonium salts, metal salts, esters or anhydrides of suiphonic acids.

Where phenols used in accordance with the invention, these may be non-sulphurized or, preferably, sulphurized. Further, the term "phenol" as used herein includes phenols containing more than one hydroxyl group (for example, alkyl catechols) or fused aromatic rings (for example, alkyl naphthols) and phenols which have been modified by chemical reaction, for example, alkylene-bridged phenols and Mannich base-condensed phenols; and saligenin-type phenols (produced by the reaction of a phenol and an aldehyde under basic conditions).

Preferred phenols from which overbased detergents prepared in accordance with the invention may be derived are of the formula

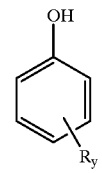

where R represents a hydrocarbyl group and y represents 1 to 4. Where y is greater than 1, the hydrocarbyl groups may be the same or different.

In lubricating oil overbased detergents the phenols are frequently used in sulphurized form. Sulphurized hydrocarbyl phenols may typically be represented by the formula:

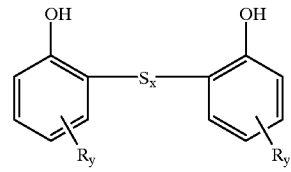

where x is generally from 1 to 4. In some cases, more than two phenol molecules may be linked by $S_x$ bridges.

In the above formulae, hydrocarbyl groups represented by R are advantageously alkyl groups, which advantageously contain 5 to 100 carbon atoms, preferably 5 to 40 carbon atoms, especially 9 to 12 carbon atoms, the average number of carbon atoms in all of the R groups being at least about 9 in order to ensure adequate solubility in oil. Preferred alkyl groups are nonyl (tripropylene) groups.

In the following discussion, hydrocarbyl-substituted phenols will for convenience be referred to as alkyl phenols.

A sulphurizing agent for use in preparing a sulphurized phenol or phenate may be any compound or element which introduces —(S)$_x$— bridging groups between the alkyl phenol monomer groups, wherein x is generally from 1 to about 4. Thus, the reaction may be conducted with elemental sulphur or a halide thereof, for example, sulphur dichloride or, more preferably, sulphur monochloride. If elemental sulphur is used, the sulphurization reaction may be effected by heating the alkyl phenol compound at from 50 to 250° C., and preferably at least 100° C. The use of elemental sulphur will typically yield a mixture of bridging groups —(S)$_x$— as described above. If a sulphur halide is used, the sulphurization reaction may be effected by treating the alkyl phenol at from −10° C. to 120° C., preferably at least 60° C. The reaction may be conducted in the presence of a suitable diluent. The diluent advantageously comprises a substantially inert organic diluent, for example mineral oil or an alkane. In any event, the reaction is conducted for a period of time sufficient to effect substantial reaction. It is generally preferred to employ from 0.1 to 5 moles of the alkyl phenol material per equivalent of sulphurizing agent.

Where elemental sulphur is used as the sulphurizing agent, it may be desirable to use a basic catalyst, for example, sodium hydroxide or an organic amine, preferably a heterocyclic amine (e.g., morpholine).

Details of sulphurization processes are well known to those skilled in the art.

Regardless of the manner in which they are prepared, sulphurized alkyl phenols useful in preparing overbased detergents generally comprise diluent and unreacted alkyl phenols and generally contain from 2 to 20 mass %, preferably 4 to 14 mass %, and most preferably 6 to 12 mass %, sulphur based on the mass of the sulphurized alkyl phenol.

As indicated above, the term "phenol" as us ed herein includes phenols which have been modified by chemical reaction with, for example, an atdehyde, and Mannich base-condensed phenols.

Aldehydes with which phenols used in accordance with the invention may be modified in clude, for example, formaldehyde, propionaldehyde and butyral dehyde. The preferred aldehyde is formaldehyde. Aldehyde-modified phenols suitable for use in accordance with the present invention are described in, for example, U.S. Pat. No. 5,259,967.

Mannich base-condensed phenols are prepared by the reaction of a phenol, an aidehyde and an amine. Examples of suitable Mannich base-condensed phenols a re described in GB-A-2 121 432.

In general, the phenols m ay include substituents other than those mentioned above provided that such substituents do not detract significantly from the surfactant properties of the phenols. Examples of such substituents are methoxy groups and halogen atoms.

In the method of the invention, the mass ratios of the components are advantageously such that the proportion, measured as described herein, of phenol surfactant, if present, or salicylic acid surfactant, if present , i n the surfactant system of the overbased detergent is at least 15 mass %, advantageously at least 25 mass %, preferably at least 35 mass %, more preferably at least 45 mass %, especially at least 55 mass %, more especially at least 70 mass %.

At least one of the surfactants used as starting material may be a sulphurized or non-sulphurized salicylic acid or a derivative thereof.

Salicylic acids used in accordance with the invention may be non-sulphurized or sulphurized, and may be chemically modified and/or contain additional substituents, for example, as discussed above for phenols. Processes similar to those described above may also be used for sulphurizing a hydrocarbyl-substituted salicylic acid, and are well known to those skilled in the art. Salicylic acids are typically prepared by the carboxylation, by the Kolbe-Schmitt process, of phenoxides, and in that case, will generally be obtained (normally in a diluent) in admixture with uncarboxylated phenol.

Preferred substituents in oil-soluble salicylic acids from which overbased detergents in accordance with the invention may be derived are the substituents represented by R in the above discussion of phenols. In alkyl-substituted salicylic acids, the alkyl groups advantageously contain 5 to 100 carbon atoms, preferably 9 to 30 carbon atoms, especially 14 to 20 carbon atoms.

At least one of the surfactants used as starting material may be a sulphonic acid or a derivative thereof.

Sulphonic acids used in accordance with the invention are typically obtained by sulphonation of hydrocarbyl-substituted, especially alkyl-substituted, aromatic hydrocarbons, for example, those obtained from the fractionation of petroleum by distillation and/or extraction, or by the alkylation of aromatic hydrocarbons. Examples include those obtained by alkylating benzene, toluene, xylene, naphthalene, biphenyl or their halogen derivatives, for example, chlorobenzene, chlorotoluene or chloronaphthalene. Alkylation of aromatic hydrocarbons may be carried out in the presence of a catalyst with alkylating agents having from about 3 to more than 100 carbon atoms, such as, for example, haloparaffins, olefins that may be obtained by dehydrogenation of paraffins, and polyolefins, for example, polymers of ethylene, propylene, and/or butene. The alkylaryl sulphonic acids usually contain from about 7 to about 100 or more carbon atoms. They preferably contain from about 16 to about 80 carbon atoms, or 12 to 40 carbon atoms, per alkyl-substituted aromatic moiety, depending on the source from which they are obtained.

When neutralizing these alkylaryl sulphonic acids to provide sulphonates, hydrocarbon solvents and/or diluent oils may also be included in the reaction mixture, as well as promoters and viscosity control agents.

Another type of sulphonic acid which may be used in accordance with the invention comprises alkyl phenol sulphonic acids. Such sulphonic acids can be sulphurized. Whether sulphurized or non-sulphurized these sulphonic acids are believed to have surfactant properties comparable to those of sulphonic acids, rather than surfactant properties comparable to those of phenols.

Sulphonic acids suitable for use in accordance with the invention also include alkyl sulphonic acids. In such compounds the alkyl group suitably contains 9 to 100 carbon atoms, advantageously 12 to 80 carbon atoms, especially 16 to 60 carbon atoms.

If desired, at least one of the surfactants from which the surfactant system in the overbased detergent is derived may be a carboxylic acid.

Carboxylic acids which may be used in accordance with the invention include mono- and dicarboxylic acids. Preferred monocarboxylic acids are those containing 1 to 30 carbon atoms, especially 8 to 24 carbon atoms. (Where this specification indicates the number of carbon atoms in a carboxylic acid, the carbon atom(s) in the carboxylic group (s) is/are included in that number.) Examples of monocarboxylic acids are iso-octanoic acid, stearic acid, oleic acid, palmitic acid and behenic acid. Iso-octanoic acid may, if desired, be used in the form of the mixture of C8 acid isomers sold by Exxon Chemical under the trade name "Cekanoic". Other suitable acids are those with tertiary substitution at the α-carbon atom and dicarboxylic acids with more than 2 carbon atoms separating the carboxylic groups. Further, dicarboxylic acids with more than 35 carbon atoms, for example, 36 to 100 carbon atoms, are also suitable. Unsaturated carboxylic acids can be sulphurized. Although salicylic acids contain a carboxylic group, for the purposes of the present specification they are considered to be a separate group of surfactants, and are not considered to be carboxylic acid surfactants. (Nor, although they contain a hydroxyl group, are they considered to be phenol surfactants.)

In one aspect of the invention, where a carboxylic acid/ derivative is used, this is not (a) an acid of the formula $R^a$—CH($R^b$)—COOH, wherein $R^a$ represents an alkyl or alkenyl group containing 10 to 24 carbon atoms and $R^b$ represents hydrogen, an alkyl group with 1 to 4 carbon atoms, or a CH₂COOH group, or an acid anhydride, acid chloride or ester thereof, or (b) a di- or polycarboxylic acid containing from 36 to 100 carbon atoms or an acid anhydride, acid chloride or ester thereof. In another aspect of the invention the carboxylic acid/derivative, if used, has 8 to 11 carbon atoms in the carboxylic-containing moiety.

In a further aspect of the invention, where a carboxylic acid/derivative is used, this is not a monocarboxylic acid/derivative with more than 11 carbon atoms in the carboxylic-containing moiety. In another aspect, the carboxylic acid/derivative is not a dicarboxylic acid/derivative with more than 11 carbon atoms in the carboxylic-containing moiety. In a further aspect, the carboxylic acid/derivative is not a polycarboxylic acid/derivative with more than 11 carbon atoms in the carboxylic-containing moiety. In another aspect, a carboxylic acid surfactant is not a hydrocarbyl-substituted succinic acid or a derivative thereof.

Examples of other surfactants which may be used in accordance with the invention include the following compounds, and derivatives thereof: naphthenic acids, especially naphthenic acids containing one or more alkyl groups, dialkylphosphonic acids, dialkylthiophosphonic acids, and dialkyldithiophosphoric acids, high molecular weight (preferably ethoxylated) alcohols, dithiocarbamic acids, thiophosphines, and dispersants. Surfactants of these types are well known to those skilled in the art.

Where a surfactant is used in the form of a salt, any suitable cation may be present, for example, a quaternary nitrogenous ion, or, preferably, a metal ion. Suitable metal ions include those of alkali metals, alkaline earth metals (including magnesium) and transition metals. Examples of suitable metals are lithium, potassium, sodium, magnesium, calcium, barium, copper, zinc, and molybdenum. Preferred metals are lithium, potassium, sodium, magnesium and calcium, more preferably lithium, sodium, magnesium and calcium, especially calcium. Neutralization of surfactants may be effected before addition of the basic calcium compound(s) (b) used in the overbasing step or by means of the said basic calcium compound.

If desired, a mixture of two or more members of any one group of surfactants may be used in preparing overbased detergents in accordance with the invention, provided that at least one surfactant from a different group is also present. Thus, for example, many processes for introducing substituents into aromatic rings will result in a mixture of compounds, and it is normally convenient to use such a mixture without separating its components from one another.

Where in this specification an overbased detergent is said to be prepared from certain specified surfactants the total proportion of those surfactants (in free) form, in the surfactant system of the overbased detergent is advantageously at least 75 mass %, preferably at least 85 mass %, especially at least 95 mass %.

In one advantageous aspect of the invention, the surfactant system is derivable from at least one sulphurized phenol or a derivative thereof and at least one sulphonic acid or a derivative thereof, the proportions, measured as described herein, of phenol to sulphonic acid in the surfactant system being in the range of from 15:85 to 95:5 mass %, preferably 30:70 to 70:30 mass %, especially 40:60 to 60:40 mass %.

In another advantageous aspect of the invention, the surfactant system is derived from at least one sulphurized phenol or a derivative thereof, at least one sulphonic acid or a derivative thereof and at least one carboxylic acid or a derivative thereof, the proportions, measured as defined herein, of phenol to sulphonic acid to carboxylic acid in the surfactant system of the overbased detergent being in the range of from 5 to 90:5 to 90:5 to 90 mass %; preferably 20 to 80:10 to 50:10 to 50 mass %; especially 30 to 70:10 to 30:10 to 30 mass %.

In a further advantageous aspect of the invention, the surfactant system of the overbased detergent is derived from at least one sulphurized phenol or a derivative thereof, at least one salicylic acid or a derivative thereof, and at least one sulphonic acid or a derivative thereof, the proportions, measured as described herein, of phenol to salicylic acid to suiphonic acid in the surfactant system being in the range of from 5 to 90 mass %: 5 to 90 mass %: 20 to 80 mass %; preferably 20 to 80 mass %: 20 to 80 mass %: 10 to 50 mass %; especially 30 to 50 mass %: 25 to 45 mass %: 15 to 35 mass %.

The invention makes it possible to obtain high TBN overbased phenate detergents while minimizing the amount of the (relatively expensive) surfactant component of the overbased detergent: thus, the invention makes it possible to obtain overbased detergents with a relatively high TBN:% surfactant ratio. This is of particular advantage in the case of lubricants for marine use, as marine engines require relatively large amounts of lubricants containing high TBN overbased detergents (for example, Marine Diesel Cylinder Lubricants (MDCL) are "once through" lubricants), but is also of advantage in the case of other lubricants, for example, crankcase lubricants. Further, the invention makes it possible to provide highly effective overbased detergents having a relatively low viscosity, even when the surfactant system contains a relatively high proportion of phenate and/or salicylate.

High TBN calcium overbased sulphonates and carboxylates with low viscosities were previously known. The provision of calcium overbased detergents comprising a surfactant system which can, if desired, contain a relatively high proportion of phenate and/or salicylate (thus giving good performance levels in a number of applications, for example, in marine lubricants) while minimising the amount of relatively expensive surfactant required, and which may also have a high TBN and low viscosity, represents a significant technical advance.

Further, previously proposed processes for preparing overbased phenate and/or salicylate detergents typically employed relatively high carbonation temperatures, for example, temperatures of more than 100° C. and, in many prior proposals, the use of a surfactant such as certain carboxylic acids having at least 12 carbon atoms was taught as being essential for obtaining a satisfactory product. In accordance with the present invention, carbonation is carried out at lower temperatures, and can be carried out without reagents such as glycols necessary when operating at higher temperatures. Furthermore, satisfactory products can be obtained without the use of certain carboxylic acids having at least 12 carbon atoms previously taught to be essential.

As indicated above, the overbased detergents prepared according to the invention are hybrid overbased detergents, that is, overbased detergents obtained by overbasing a mixture containing two or more surfactants. Such hybrid detergents have the advantage of making it possible to provide an overbased detergent system having properties contributed by two or more surfactants without the need to manufacture and blend two or more separate overbased detergents. Further, elimination of the need to blend separate overbased detergents gives more flexibility as to the final TBN, surfactant proportions, and the TBN:% surfactant ratios, and may also overcome problems of incompatibility or stability that may be experienced when preparing blends containing separate overbased detergents.

More particularly, the hybrid overbased detergents of the present invention have been found to give rise to improved stability when used in formulating lubricating oils, for example, for trunk piston marine diesel engines, i.e. medium-speed marine diesel engines. In particular, when formulating such oils to contain phenate, sulfonate and salicylate surfactant anions, greater stability, as measured by the percent volume sediment reduction in stored oil, is achieved when two or more of those anions are provided in the oil in the form of a complex detergent of the present invention. This is in comparison with such oils where the three anions are provided separately in the oil.

For example, an oil formulated with a phenate:sulfonate hybrid overbased detergent of the invention and a salicylate provided separately, and an oil formulated with a phenate-:sulfonate:salicylate hybrid overbased detergent of the invention each has greater stability than a comparable oil formulated with a phenate, a sulfonate and a salicylate each provided separately.

Overbased detergents prepared in accordance with the invention, which are normally prepared as concentrates in oil containing, for example, 50 to 70 mass % overbased detergent based on the mass of the concentrate, are useful as additives for oil-based compositions, for example, lubricants or greases, and the invention thus also provides such compositions containing the overbased detergents, and concentrates for use in preparing such compositions. The amount of overbased detergent to be included in the oil-based composition depends on the type of composition and its proposed application: lubricants for marine applications typically contain 0.5 to 18 mass % of overbased detergent, on an active ingredient basis based on the final lubricant, while automotive crankcase lubricating oils typically contain 0.01 to 6 mass % of overbased detergent, on an active ingredient basis based on the final lubricant.

Overbased detergents prepared in accordance with the invention, are oil-soluble or (in common with certain of the other additives referred to below) are dissolvable in oil with the aid of a suitable solvent, or are stably dispersible materials. Oil-soluble, dissolvable, or stably dispersible as that terminology is used herein does not necessarily indicate that the additives are soluble, dissolvable, miscible, or capable of being suspended in oil in all proportions. It does mean, however, that the additives are, for instance, soluble or stably dispersible in oil to an extent sufficient to exert their intended effect in the environment in which the oil is employed. Moreover, the incorporation in an oil-based composition of other additives may permit incorporation of higher levels of a particular additive, if desired.

The overbased detergents may be incorporated into a base oil in any convenient way. Thus, they may be added directly to the oil by dispersing or by dissolving them in the oil at the desired level of concentration, optionally with the aid of a suitable solvent such, for example, as toluene or cyclohexane. Such blending can occur at room temperature or at elevated temperature.

Overbased detergents prepared in accordance with the invention are particularly useful in lubricating oil compositions which employ a base oil in which the mixtures are dissolved or dispersed. Base oils with which the overbased detergents may be used include those suitable for use as crankcase lubricating oils for spark-ignited and compression-ignited internal combustion engines, for example, automobile and truck engines, and marine diesel engines. As indicated above, the overbased detergents are of particular utility in lubricants for use in marine engines.

Synthetic base oils include alkyl esters of dicarboxylic acids, polyglycols and alcohols; poly-α-olefins, including polybutenes; alkyl benzenes; organic esters of phosphoric acids; and polysilicone oils.

Natural base oils include mineral lubricating oils which may vary widely as to their crude source, for example, as to whether they are paraffinic, naphthenic, mixed, or paraffinic-naphthenic, as well as to the method used in their production, for example, their distillation range and whether they are straight run or cracked, hydrofined, or solvent extracted.

Lubricating oil base stocks suitable for use in crankcase lubricants conveniently have a viscosity of about 2.5 to about 12 cSt, or $mm^2/s$, at 100° C., although base stocks with other viscosities may be used, for example, bright stock.

Lubricating oil base stocks suitable for use in marine lubricants conveniently have a viscosity of typically about 3 to about 15 cSt, or $mm^2/s$, at 100° C., although base stocks with other viscosities may also be used. Thus, for example, bright stocks, which typically have a viscosity of about 30 to 35 cSt, or $mm^2/s$, at 100° C. may be used.

An overbased detergent prepared in accordance with the present invention may be employed in a lubricating oil composition which comprises lubricating oil, typically in a major proportion, and the overbased detergent, typically in a minor proportion. Additional additives may be incorporated in the composition to enable it to meet particular requirements. Examples of additional additives which may be included in lubricating oil compositions containing an overbased detergent in accordance with the invention are viscosity index improvers, corrosion inhibitors, other oxidation inhibitors or antioxidants, friction modifiers, dispersants, other detergents, metal rust inhibitors, anti-wear agents, pour point depressants, and anti-foaming agents. Lubricating oils suitable for use in marine engines advantageously include a dispersant and an antiwear agent as additional additives and may also contain other additives, for example, additional antioxidants, antifoaming agents and/or rust inhibitors. Certain of the additional additives specified below are more appropriate for use in lubricants for automobile engines than for use in lubricants for marine engines.

Viscosity index improvers (or viscosity modifiers) impart high and low temperature operability to a lubricating oil and permit it to remain shear stable at elevated temperatures and also exhibit acceptable viscosity or fluidity at low temperatures. Suitable compounds for use as viscosity modifiers are generally high molecular weight hydrocarbon polymers, including polyesters, and viscosity index improver dispersants, which function as dispersants as well as viscosity index improvers. Oil-soluble viscosity modifying polymers generally have weight average molecular weights of from about 10,000 to 1,000,000, preferably 20,000 to 500,000, as determined by gel permeation chromatography or light scattering methods.

Corrosion inhibitors reduce the degradation of metallic parts contacted by the lubricating oil composition. Thiadiazoles, for example those disclosed in U.S. Pat. 2,719,125, 2,719,126 and 3,087,932, are examples of corrosion inhibitors for lubricating oils.

Oxidation inhibitors, or antioxidants, reduce the tendency of mineral oils to deteriorate in service, evidence of such deterioration being, for example, the production of varnish-like deposits on metal surfaces and of sludge, and viscos increase. Suitable oxidation inhibitors include sulphurized alkyl phenols and alkali or alkaline earth metal salts thereof; diphenylamines; phenyl-naphthylamines; and phosphosulphurized or sulphurized hydrocarbons.

Other oxidation inhibitors or antioxidants which may be used in lubricating oil compositions comprise oil-soluble copper compounds. The copper may be blended into the oil as any suitable oil-soluble copper compound. By oil-soluble it is meant that the compound is oil-soluble under normal blending conditions in the oil or additive package. The copper may, for example, be in the form of a copper dihydrocarbyl thio- or dithio-phosphate. Alternatively, the copper may be added as the copper salt of a synthetic or natural carboxylic acid, for example, a $C_8$ to $C_{18}$ fatty acid, an unsaturated acid, or a branched carboxylic acid. Also useful are oil-soluble copper dithiocarbamates, sulphonates, phenates, and acetylacetonates. Examples of particularly useful copper compounds are basic, neutral or acidic copper $Cu^I$ and/or $Cu^{II}$ salts derived from alkenyl succinic acids or anhydrides.

Copper antioxidants will generally be employed in an amount of from about 5 to 500 ppm by weight of the copper, in the final lubricating composition.

Friction modifiers and fuel economy agents which are compatible with the other ingredients of the final oil may also be included. Examples of such materials are glyceryl monoesters of higher fatty acids, esters of long chain polycarboxylic acids with diols, oxazoline compounds, and oil-soluble molybdenum compounds.

Dispersants maintain oil-insoluble substances, resulting from oxidation during use, in suspension in the fluid, thus preventing sludge flocculation and precipitation or deposition on metal parts. So-called ashless dispersants are organic materials which form substantially no ash on combustion, in contrast to metal-containing (and thus ash-forming) detergents. Borated metal-free dispersants are also regarded herein as ashless dispersants. Suitable dispersants include, for example, derivatives of long chain hydrocarbon substituted carboxylic acids in which the hydrocarbon groups contain 50 to 400 carbon atoms, examples of such derivatives being derivatives of high molecular weight hydrocarbyl-substituted succinic acid. Such hydrocarbyl-substituted carboxylic acids may be reacted with, for example, a nitrogen-containing compound, advantageously a polyalkylene polyamine, or with an ester. Particularly preferred dispersants are the reaction products of polyalkylene amines with alkenyl succinic anhydrides.

A viscosity index improver dispersant functions both as a viscosity index improver and as a dispersant. Examples of viscosity index improver dispersants suitable for use in lubricating compositions include reaction products of amines, for example polyamines, with a hydrocarbyl-substituted mono- or dicarboxylic acid in which the hydrocarbyl substituent comprises a chain of sufficient length to impart viscosity index improving properties to the compounds.

Examples of dispersants and viscosity index improver dispersants may be found in EP-A-24146.

Additional detergents and metal rust inhibitors include the metal salts, which may be overbased, of sulphonic acids, alkyl phenols, sulphurized alkyl phenols, alkyl salicylic acids, thiophosphonic acids, naphthenic acids, and other oil-soluble mono- and dicarboxylic acids. Representative examples of detergents/rust inhibitors, and their methods of preparation, are given in EP-A-208 560.

Antiwear agents, as their name implies, reduce wear of metal parts. Zinc dihydrocarbyl dithiophosphates (ZDDPs) are very widely used as antiwear agents. Especially preferred ZDDPs for use in oil-based compositions are those of the formula $Zn[SP(S)(OR^1)(OR^2)]_2$ wherein $R^1$ and $R^2$ contain from 1 to 18, and preferably 2 to 12, carbon atoms.

Pour point depressants, otherwise known as lube oil flow improvers, lower the minimum temperature at which the fluid will flow or can be poured. Such additives are well known. Foam control may be provided by an antifoamant of the polysiloxane type, for example, silicone oil or polydimethyl siloxane.

Some of the above-mentioned additives may provide a multiplicity of effects; thus for example, a single additive may act as a dispersant-oxidation inhibitor. This approach is well known and need not be further elaborated herein.

When lubricating compositions contain one or more of the above-mentioned additives, each additive is typically blended into the base oil in an amount which enables the additive to provide its desired function. Representative effective amounts of such additives, when used in crankcase lubricants, are as follows:

| Additive | Mass % a.i.* (Broad) | Mass % a.i.* (Preferred) |
|---|---|---|
| Viscosity Modifier | 0.01–6 | 0.01–4 |
| Corrosion Inhibitor | 0.01–5 | 0.01–1.5 |
| Oxidation Inhibitor | 0.01–5 | 0.01–1.5 |
| Friction Modifier | 0.01–5 | 0.01–1.5 |
| Dispersant | 0.1–20 | 0.1–8 |
| Detergents/rust inhibitors | 0.01–6 | 0.01–3 |
| Anti-wear Agent | 0.01–6 | 0.01–4 |
| Pour Point Depressant | 0.01–5 | 0.01–1.5 |
| Anti-Foaming Agent | 0.001–3 | 0.001–0.15 |
| Mineral or Synthetic Base Oil | Balance | Balance |

*Mass % active ingredient based on the final oil.

Typical proportions for additives for a TPEO (a trunk piston engine oil) are as follows:

| Additive | Mass % a.i.* (Broad) | Mass % a.i.* (Preferred) |
|---|---|---|
| Detergent(s) | 0.5–10 | 2–7 |
| Dispersant(s) | 0.5–5 | 1–3 |
| Anti-wear agent(s) | 0.1–1.5 | 0.5–1.3 |
| Oxidation inhibitor | 0.2–2 | 0.5–1.5 |
| Rust inhibitor | 0.03–0.15 | 0.05–0.1 |
| Pour point depressant | 0.03–0.15 | 0.05–0.1 |
| Mineral or synthetic base oil | Balance | Balance |

*Mass % active ingredient based on the final oil.

Typical proportions for additives for a MDCL (a marine diesel cylinder lubricant) are as follows:

| Additive | Mass % a.i.* (Broad) | Mass % a.i.* (Preferred) |
|---|---|---|
| Detergent(s) | 1–18 | 3–12 |
| Dispersant(s) | 0.5–5 | 1–3 |
| Anti-wear agent(s) | 0.1–1.5 | 0.5–1.3 |
| Pour point depressant | 0.03–0.15 | 0.05–0.1 |
| Mineral or synthetic base oil | Balance | Balance |

*Mass % active ingredient based on the final oil.

When a plurality of additives are employed it may be desirable, although not essential, to prepare one or more additive packages comprising the additives, whereby several additives can be added simultaneously to the base oil to form the lubricating oil composition. Dissolution of the additive package(s) into the lubricating oil may be facilitated by solvents and by mixing accompanied with mild heating, but this is not essential. The additive package(s) will typically be formulated to contain the additive(s) in proper amounts to provide the desired concentration in the final formulation when the additive package(s) is/are combined with a predetermined amount of base lubricant. Thus, one or more overbased detergents in accordance with the present invention may be added to small amounts of base oil or other compatible solvents together with other desirable additives to form additive packages containing active ingredients in an amount, based on the additive package, of, for example, from about 2.5 to about 90 mass %, and preferably from about 5 to about 75 mass %, and most preferably from about 8 to about 60 mass % by weight, additives in the appropriate proportions with the remainder being base oil.

The final formulations may typically contain about 5 to 40 mass % of the additive package(s) with the remainder being base oil.

The following Examples illustrate the invention.

EXAMPLE 1

350 g toluene, 300 g methanol, and 26 g water were introduced into a reactor and mixed while maintaining the temperature at approximately 20° C. Calcium hydroxide $(Ca(OH)_2)$ (94 g) was added, and the mixture was heated to 40° C., with stirring. To the slurry obtained in this way was added a mixture, maintained at 40° C., of the phenol and sulphonic acid surfactants specified in Table 1 and 100 g toluene, followed by a further quantity (50 g) of toluene. The salicylic acid surfactant specified in Table 1 was then introduced into the mixture.

After neutralization of the surfactants by the calcium hydroxide, the temperature of the mixture was reduced to approximately 28° C. and was maintained at approximately 28° C. while carbon dioxide (38 g) was injected into the mixture at a rate such that substantially all the carbon dioxide was absorbed in the reaction mixture to form the basic material. The temperature was then raised to 60° C. over 60 minutes, following which the mixture was cooled to a temperature of approximately 28° C. over 30 minutes. At 28° C., a further quantity of calcium hydroxide (55 g) was added and carbon dioxide (26 g) was charged. After this second carbonation step, the temperature was raised to 60° C. over 90 minutes.

Subsequently, the polar solvents were distilled off and the product was filtered to remove sediment. The remaining volatile material was then distilled off and diluent oil (125 g) was added.

Details of the starting materials used in all the Examples are given in Table 1 and the notes thereon. The quantity of diluent oil (SN 150) in Table 1 is the total amount charged. Table 2 gives the TBN, the % total surfactant (Y, determined as described herein) and the TBN:% total surfactant ratio (X, determined as described herein), the standardized TBN, and the proportions of individual surfactants in the surfactant system of the overbased detergent (see Note 2 to Tables 1 and 2) of the overbased detergent, together with viscosity data and the filtration rate (in $kg/m^2/h$) and filtration gradient.

EXAMPLES 2 to 67

The method indicated in Example 1 was repeated, except as indicated below, using the starting materials, and proportions of starting materials, indicated in Table 1 and the notes thereon, and using amounts of toluene, methanol and water within the following ranges: toluene –500 to 690 g; methanol –270 to 330 g; water –15 to 25 g. Characteristics of the overbased detergents obtained are specified in Table 2.

In Examples 2, 15, 16 to 18, and 20, 15 g of formic acid was also introduced into the reactor.

In Example 28, SN600 oil was used instead of SN150 oil.

In Examples 1, 3, 4, 13 to 15, 19, 21 to 23, 25, 37 to 46 and 60, the product was filtered in solvents, after removal of polar solvents. In the remaining Examples, after the second heat-soaking step the volatile materials were distilled off, a second charge of diluent oil was introduced, and the product was filtered to remove sediment.

In Example 35 carbonation was carried out at 30° C.

In Examples 61 and 62 there was an additional (third) calcium hydroxide addition, carbon dioxide addition, and heat-soaking sequence, carried out under the conditions indicated in Example 1 for the second such sequence, except that each heat-soaking step was carried out as in the first sequence. In Examples 63 and 64 there were three (third, fourth and fifth) additional such sequences, each carried out under the conditions indicated in Example 1 for the second sequence, except that each heat-soaking step was carried out as in the first sequence.

In Example 65 carbonation was carried out at 55° C. The product was isolated by distilling off polar solvents, adding toluene, centrifuging to remove sediment, and then distilling off volatile material.

The production of the overbased detergents according to the present invention may be associated with evolution of sulphur compounds such as hydrogen sulphide and mercaptans, particularly when the detergent is required, for operational reasons, to be maintained at elevated temperature, such as above 130° C., for extended periods, following distilling off the volatile materials and prior to filtration to remove sediment.

Such evolution is undesirable because it interferes with safe and hygienic plant operation. One way of preventing or ameliorating such evolution is by olefin treatment at any stage in the production of the detergent. For example, the olefin can be incorporated at any stage of raw material preparation, neutralisation, overbasing, volatile material distillation, or period spent at elevated temperature, i.e. at any stage in the preparation of the detergent. Incorporation during solvent distillation is preferred, e.g. at about 130° C.

Any olefin that can remain in solution or in dispersion in the detergent at elevated temperature can be used. Examples of such olefins are those with high or low substitution having from 18 to 60 carbon atoms or more. Specific examples of such olefins are n-octadecene; an olefin mixture having, on average, 24 carbon atoms; and oligomers of butene. A suitable treat rate of the olefin is from 0.1 to 5 or more mass/% based in the finished detergent, preferably 0.1 to 2 mass/%.

TABLE 1

Charges for Examples 1 to 67

| Ex. No. | Phenol (g) +source | Sulphonic acid (g) +source | Salicylic acid (g) +source | Carboxylic Acid (g) | $CO_2$ (g) | $Ca(OH)_2$ (g) | SN150 (g) |
|---|---|---|---|---|---|---|---|
| 1 | 48 (1) | 61 (1) | 78 (1) | 0 | 64 | 149 | 125 |
| 2 | 88 (1) | 58 (1) | 0 | 17 | 54 | 155 | 135 |
| 3 | 96 (1) | 52 (1) | 0 | 17 | 64 | 156 | 163 |
| 4 | 47 (1) | 102 (2) | 0 | 25 | 64 | 155 | 144 |
| 5 | 258 (3) | 148 (3) | 0 | 0 | 124 | 276 | 211 |
| 6 | 229 (5) | 109 (3) | 0 | 0 | 124 | 268 | 254 |
| 7 | 229 (5) | 109 (3) | 0 | 0 | 124 | 268 | 259 |
| 8 | 230 (5) | 110 (3) | 0 | 0 | 124 | 269 | 265 |
| 9 | 229 (5) | 109 (3) | 0 | 0 | 124 | 268 | 259 |
| 10 | 394 (4) | 117 (3) | 264 (1) | 0 | 124 | 280 | 117 |
| 11 | 8650 (3) | 2490 (3) | 4900 (1) | 0 | 2500 | 5700 | 530 |
| 12 | 7510 (3) | 2200 (3) | 8420 (1) | 0 | 1370 | 5260 | 1426 |
| 13 | 88 (1) | 58 (1) | 0 | 17 | 64 | 155 | 152 |
| 14 | 59 (1) | 104 (1) | 0 | 17 | 64 | 154 | 137 |
| 15 | 39 (1) | 127 (2) | 0 | 17 | 64 | 154 | 122 |
| 16 | 88 (1) | 75 (2) | 0 | 17 | 54 | 155 | 112 |
| 17 | 88 (1) | 58 (4) | 0 | 17 | 54 | 156 | 135 |
| 18 | 88 (1) | 58 (5) | 0 | 17 | 54 | 155 | 135 |
| 19 | 69 (6) | 101 (2) | 0 | 25 | 65 | 154 | 122 |
| 20 | 88 (1) | 58 (1) | 0 | 15 | 62 | 150 | 135 |
| 21 | 84 (1) | 145 (2) | 0 | 0 | 90 | 210 | 191 |
| 22 | 85 (1) | 34 (1) +44 (2) | 0 | 0 | 64 | 154 | 144 |
| 23 | 236 (6) | 111 (2) | 0 | 0 | 64 | 146 | 102 |
| 24 | 239 (3) | 88 (3) | 0 | 0 | 124 | 272 | 289 |
| 25 | 86 (6) | 102 (2) | 0 | 0 | 65 | 146 | 111 |
| 26 | 223 (3) | 83 (3) | 0 | 0 | 127 | 275 | 282 |
| 27 | 133 (3) | 172 (3) | 0 | 0 | 124 | 269 | 285 |
| 28 | 238 (3) | 110 (3) | 0 | 0 | 124 | 272 | 267 |
| 29 | 333 (5) | 59 (1) | 0 | 0 | 124 | 272 | 231 |
| 30 | 341 (5) | 66 (3) | 0 | 0 | 124 | 272 | 399 |
| 31 | 229 (5) | 109 (3) | 0 | 0 | 124 | 268 | 245 |
| 32 | 183 (5) | 88 (3) | 0 | 0 | 124 | 265 | 150 |
| 33 | Product of Example 32 diluted with SN 150 | | | | | | |
| 34 | 180 (5) | 86 (3) | 0 | 0 | 162 | 340 | 181 |
| 35 | 231 (5) | 111 (3) | 0 | 0 | 124 | 271 | 267 |
| 36 | 171 (7) | 107 (3) | 0 | 0 | 124 | 258 | 288 |
| 37 | 132 (1) | 0 | 228 (1) | 0 | 65 | 146 | 199 |
| 38 | 250 (2) | 0 | 430 (1) | 0 | 77 | 186 | 49 |
| 39 | 0 | 104 (2) | 102 (1) | 0 | 65 | 145 | 88 |
| 40 | 60 (1) | 53 (1) | 79 (1) | 0 | 64 | 150 | 119 |
| 41 | 27 (1) | 57 (1) | 122 (1) | 0 | 64 | 146 | 98 |
| 42 | 48 (1) | 30 (1) +39 (2) | 78 (1) | 0 | 64 | 149 | 108 |
| 43 | 123 (1) | 43 (2) | 71 (1) | 0 | 64 | 151 | 176 |
| 44 | 156 (1) | 82 (2) | 269 (1) | 0 | 66 | 152 | 60 |
| 45 | 147 (1) | 53 (2) | 175 (1) | 0 | 64 | 147 | 199 |
| 46 | 48 (1) | 79 (2) | 78 (1) | 0 | 64 | 143 | 93 |
| 47 | 377 (2) | 131 (2) | 216 (1) | 0 | 113 | 277 | 91 |
| 48 | 297 (6) | 70 (2) | 115 (1) | 0 | 65 | 144 | 26 |
| 49 | 311 (3) | 92 (3) | 182 (1) | 0 | 124 | 257 | 176 |
| 50 | 313 (3) | 46 (3) | 274 (1) | 0 | 124 | 270 | 137 |
| 51 | 273 (3) | 80 (3) | 306 (1) | 0 | 124 | 273 | 177 |
| 52 | 252 (3) | 96 (3) | 332 (1) | 0 | 124 | 267 | 178 |
| 53 | 150 (3) | 89 (3) | 436 (1) | 0 | 124 | 262 | 120 |
| 54 | 85 (3) | 97 (3) | 623 (1) | 0 | 124 | 258 | 69 |
| 55 | 212 (5) | 82 (3) | 290 (1) | 0 | 124 | 268 | 250 |
| 56 | 379 (5) | 42 (3) | 83 (1) | 0 | 124 | 273 | 320 |
| 57 | 221 (3) | 65 (3) | 236 (4) | 0 | 100 | 228 | 151 |
| 58 | 285 (5) | 80 (3) | 153 (3) | 0 | 124 | 273 | 308 |
| 59 | 271 (5) | 82 (3) | 313 (3) | 0 | 124 | 286 | 342 |
| 60 | 130 (2) | 25 (2) | 141 (2) | 0 | 44 | 106 | 56 |
| 61 | 182 (5) | 55 (3) | 212 (1) | 0 | 124 | 266 | 22 |
| 62 | 121 (5) | 55 (3) | 320 (1) | 0 | 124 | 263 | 22 |
| 63 | 411 (5) | 18 (1) | 0 | 0 | 124 | 275 | 215 |
| 64 | 0 | 42 (1) | 509 (1) | 0 | 124 | 254 | 120 |
| 65 | 230 (5) | 110 (3) | 0 | 0 | 124 | 269 | 161 |
| 66 | Product of Example 61 diluted with SN150 | | | | | | |
| 67 | Product of Example 62 diluted with SN150 | | | | | | |

TABLE 2

Properties for Examples 1 to 67

| Ex. No. | TBN | % Total Surf. (mass) | TBN:% Total Surf. Ratio | Stand. TBN | Ph % | Sulph % | Sal % | Carbox % | Kv$_{40}$ mm$^2$/s | KV$_{100}$ mm$^2$/s | Filt. Rate | Filt. Grad. |
|---|---|---|---|---|---|---|---|---|---|---|---|---|
| 1 | 432 | 19 | 23 | 688 | 21 | 54 | 25 | 0 | 3533 | 173 | 4525 | — |
| 2 | 426 | 22 | 19 | 698 | 36 | 48 | 0 | 16 | — | 327 | — | — |
| 3 | 424 | 20 | 21 | 695 | 40 | 44 | 0 | 16 | — | 751 | 3142 | — |
| 4 | 422 | 23 | 18 | 670 | 18 | 61 | 0 | 21 | — | 378 | 598 | — |
| 5 | 410 | 24 | 17 | 631 | 48 | 52 | 0 | 0 | 12018 | 365 | 375 | 0.57 |
| 6 | 411 | 20 | 21 | 674 | 50 | 50 | 0 | 0 | 3685 | 150 | 649 | 0.56 |
| 7 | 409 | 20 | 20 | 682 | 50 | 50 | 0 | 0 | 4053 | 169 | 665 | 0.56 |
| 8 | 408 | 20 | 20 | 706 | 50 | 50 | 0 | 0 | — | 155 | 834 | 0.61 |
| 9 | 408 | 20 | 20 | 680 | 50 | 50 | 0 | 0 | 3697 | 152 | 631 | 0.54 |
| 10 | 335 | 26 | 13 | 602 | 42 | 30 | 28 | 0 | — | 85 | 347 | 0.46 |
| 11 | 349 | 31 | 11 | 570 | 51 | 28 | 21 | 0 | 7787 | 248 | 142 | 0.62 |
| 12 | 303 | 30 | 10 | 547 | 42 | 23 | 35 | 0 | 1631 | 88 | 350 | 0.71 |
| 13 | 424 | 20 | 21 | 690 | 36 | 48 | 0 | 16 | — | 247 | 1696 | — |
| 14 | 422 | 21 | 20 | 716 | 23 | 62 | 0 | 15 | 10690 | 397 | 1939 | — |
| 15 | 425 | 22 | 19 | 655 | 14 | 72 | 0 | 14 | — | 529 | 3805 | — |
| 16 | 447 | 21 | 21 | 731 | 36 | 48 | 0 | 16 | — | 9155 | — | — |
| 17 | 417 | 20 | 21 | 691 | 36 | 48 | 0 | 16 | — | — | — | — |
| 18 | 423 | 20 | 21 | 701 | 36 | 48 | 0 | 16 | — | 1044 | — | — |
| 19 | 425 | 24 | 18 | 658 | 24 | 56 | 0 | 20 | 31150 | 1119 | 1015 | — |
| 20 | 442 | 18 | 25 | 748 | 43 | 57 | 0 | 0 | — | — | — | — |
| 21 | 420 | 19 | 22 | 669 | 27 | 73 | 0 | 0 | 2555 | 150 | 1357 | — |
| 22 | 423 | 18 | 24 | 681 | 38 | 62 | 0 | 0 | 8670 | 271 | 479 | — |
| 23 | 353 | 30 | 12 | 603 | 58 | 42 | 0 | 0 | 12263 | 314 | 3109 | — |
| 24 | 407 | 17 | 24 | 724 | 59 | 41 | 0 | 0 | 6001 | 205 | 301 | 0.47 |
| 25 | 425 | 23 | 18 | 707 | 35 | 65 | 0 | 0 | 10656 | 452 | 4242 | — |
| 26 | 420 | 17 | 25 | 776 | 59 | 41 | 0 | 0 | 55200 | 1120 | 262 | 0.57 |
| 27 | 409 | 20 | 20 | 683 | 29 | 71 | 0 | 0 | 3813 | 193 | 229 | 0.42 |
| 28 | 409 | 19 | 22 | 703 | 54 | 46 | 0 | 0 | 26060 | 441 | 304 | 0.53 |
| 29 | 409 | 20 | 20 | 762 | 71 | 29 | 0 | 0 | 25130 | 248 | 232 | 0.49 |
| 30 | 320 | 17 | 19 | 706 | 71 | 29 | 0 | 0 | — | — | — | — |
| 31 | 416 | 20 | 21 | 750 | 50 | 50 | 0 | 0 | — | 154 | 297 | 0.52 |
| 32 | 520 | 20 | 26 | 818 | 50 | 50 | 0 | 0 | — | 1087 | — | — |
| 33 | 500 | 19 | 26 | 787 | 50 | 50 | 0 | 0 | — | 808 | — | — |
| 34 | 557 | 17 | 33 | 853 | 50 | 50 | 0 | 0 | — | 2049 | — | — |
| 35 | 412 | 20 | 21 | 744 | 50 | 50 | 0 | 0 | — | 148 | 353 | 0.48 |
| 36 | 404 | 27 | 15 | 650 | 62 | 38 | 0 | 0 | — | — | 171 | 0.37 |
| 37 | 302 | 16 | 19 | 616 | 44 | 0 | 56 | 0 | 3063 | 152 | 1131 | — |
| 38 | 304 | 24 | 13 | 557 | 44 | 0 | 56 | 0 | 1565 | 84 | 597 | — |
| 39 | 424 | 23 | 18 | 669 | 0 | 68 | 32 | 0 | 8311 | 509 | 3916 | — |
| 40 | 430 | 18 | 24 | 699 | 27 | 47 | 26 | 0 | 19988 | 608 | 1242 | — |
| 41 | 431 | 19 | 23 | 684 | 12 | 49 | 39 | 0 | >30000 | 1506 | 1697 | — |
| 42 | 428 | 19 | 23 | 687 | 21 | 54 | 25 | 0 | 12162 | 502 | 2410 | — |
| 43 | 357 | 17 | 21 | 555 | 50 | 28 | 22 | 0 | 6416 | 206 | 4427 | — |
| 44 | 305 | 26 | 12 | 523 | 33 | 26 | 41 | 0 | 1438 | 87 | 3222 | — |
| 45 | 302 | 18 | 17 | 590 | 33 | 26 | 41 | 0 | 739 | 57 | 4357 | — |
| 46 | 424 | 20 | 21 | 691 | 21 | 54 | 25 | 0 | 30832 | 1187 | 2410 | — |
| 47 | 353 | 26 | 14 | 613 | 51 | 28 | 21 | 0 | 16378 | 394 | — | — |
| 48 | 341 | 34 | 10 | 540 | 60 | 22 | 18 | 0 | 23775 | 505 | — | — |
| 49 | 349 | 23 | 15 | 636 | 50 | 28 | 22 | 0 | 2110 | 103 | — | — |
| 50 | 347 | 22 | 16 | 637 | 52 | 14 | 34 | 0 | 2515 | 120 | — | — |
| 51 | 351 | 22 | 16 | 658 | 42 | 23 | 35 | 0 | — | 157 | 321 | 0.53 |
| 52 | 333 | 23 | 14 | 625 | 37 | 27 | 36 | 0 | 1487 | 94 | — | — |
| 53 | 353 | 23 | 15 | 645 | 23 | 26 | 51 | 0 | 21100 | 1093 | — | — |
| 54 | 344 | 25 | 14 | 630 | 12 | 25 | 63 | 0 | 3171 | 232 | — | — |
| 55 | 349 | 22 | 16 | 703 | 34 | 27 | 39 | 0 | — | 297 | 212 | 0.53 |
| 56 | 342 | 19 | 18 | 731 | 71 | 16 | 13 | 0 | — | 67 | 239 | 0.51 |
| 57 | 348 | 22 | 16 | 660 | 43 | 23 | 34 | 0 | 2085 | 112 | 560 | 0.50 |
| 58 | 345 | 25 | 14 | 653 | 40 | 23 | 37 | 0 | 1225 | 84 | 535 | 0.52 |
| 59 | 306 | 30 | 10 | 567 | 27 | 17 | 55 | 0 | — | — | 699 | 0.59 |
| 60 | 300 | 25 | 12 | 537 | 43 | 13 | 44 | 0 | 19025 | 398 | 2909 | — |
| 61 | 498 | 24 | 21 | 768 | 39 | 24 | 37 | 0 | — | 4289 | — | — |
| 62 | 474 | 24 | 20 | 756 | 24 | 23 | 53 | 0 | — | 15837 | — | — |
| 63 | 346 | 19 | 18 | 666 | 91 | 9 | 0 | 0 | — | 210 | — | — |
| 64 | 373 | 21 | 18 | 720 | 0 | 18 | 82 | 0 | — | 75 | — | — |
| 65 | 405 | 23 | 18 | 661 | 50 | 50 | 0 | 0 | — | 137 | — | — |
| 66 | 407 | 20 | 20 | 768 | 39 | 24 | 37 | 0 | — | 188 | — | — |
| 67 | 417 | 21 | 20 | 756 | 24 | 23 | 53 | 0 | — | 792 | — | — |

Notes on Tables 1 and 2

1. The sources of the phenol, sulphonic acid, salicylic acid and carboxylic acid surfactants (see Table 1) are given in Table 3 below. In that table:

surfactant respectively (in hydrolyzed form), based on the mass of the total surfactant (in hydrolyzed form) associated with the basic calcium compound in the overbased detergent.

TABLE 3

Surfactant sources in Tables 1 and 2

| Surfactant | Description |
|---|---|
| Phenol source 1 | A sulphurized alkyl phenol, synthesized from sulphur dichloride and a 65/35 (by mass) blend of tertiary nonyl (tripropylene) phenols (predominantly para-substituted) and tertiary dinonyl phenols (predominantly 2,4-substituted). (a.i. = 70; r.i. = 40) |
| Phenol source 2 | A sulphurized alkyl phenol, synthesized from sulphur dichloride and a 65/35 (by mass) blend of tertiary nonyl (tripropylene) phenols (predominantly para-substituted) and tertiary dinonyl phenols (predominantly 2,4-substituted). (a.i. = 68; r.i. = 40) |
| Phenol source 3 | A sulphurized alkyl phenol synthesized from sulphur monochloride and a 65/35 (by mass) blend of tertiary nonyl (tripropylene) phenols (predominantly para-substituted) and tertiary dinonyl phenols (predominantly 2,4-substituted). (a.i. = 72; r.i. = 40) |
| Phenol source 4 | A sulphurized alkyl phenol, synthesized from sulphur monochloride and a 65/35 (by mass) blend of tertiary nonyl (tripropylene) phenols (predominantly para-substituted) and tertiary dinonyl phenols (predominantly 2,4-substituted). (a.i. = 70; r.i. = 34) |
| Phenol source 5 | A sulphurized alkyl phenol, synthesized from sulphur monochloride and a 65/35 (by mass) blend of tertiary nonyl (tripropylene) phenols (predominantly para-substituted) and tertiary dinonyl phenols (predominantly 2,4-substituted). (a.i. = 84; r.i. = 40) |
| Phenol source 6 | A low base number sulphurized calcium alkyl phenate; alkyl phenate source is tertiary dodecyl (tetra-propylene) phenols, largely para-substituted (TBN = 135). (a.i. = 62; r.i. = 48) |
| Phenol source 7 | A methylene bridged phenol, synthesized from a 65/35 (by mass) blend of tertiary nonyl (tripropylene) phenols (predominantly 4-substituted) and tertiarydinonyl phenols (predominantly 2,4-substituted). (a.i. = 100; r.i. = 86) |
| Sulphonic acid source 1 | An alkyl benzene sulphonic acid, derived from $SO_3$ (in liquid $SO_2$) with a molecular weight of 495 (a.i. = 100; r.i. = 90) |
| Sulphonic acid source 2 | An alkyl benzene sulphonic acid, derived from $SO_3$ (in liquid $SO_2$) with a molecular weight of 683 (a.i. = 76; r.i. = 70) |
| Sulphonic acid source 3 | An alkyl benzene sulphonic acid, derived from $SO_3$ (in liquid $SO_2$) with a molecular weight of 683 (a.i. = 96; r.i. = 84) |
| Sulphonic acid source 4 | An alkyl benzene sulphonic acid, derived from $SO_3$ (in liquid $SO_2$) with a molecular weight of 365 (a.i. = 97; r.i. = 90) |
| Sulphonic acid source 5 | An alkyl benzene sulphonic acid, derived from $SO_3$ (in liquid $SO_2$) with a molecular weight of 440 (a.i. = 100; r.i. = 90) |
| Salicylic acid source 1 | A low base number calcium alkyl salicylate (TBN = 64) from Shell Chemicals Ltd. (a.i. = 50; r.i. = 35) |
| Salicylic acid source 2 | A sodium alkyl salicylate (TBN = 87). (a.i. = 44; r.i = 44) |
| Salicylic acid source 3 | An alkyl salicylic acid (a.i. = 100; r.i. = 70) |
| Salicylic acid source 4 | An alkyl salicylic acid derived from the acidification of salicylic acid source 1 (a.i. = 50; r.i. = 33) |
| Carboxylic acid | Cekanoic acid, substantially C8 (a.i. = 100; r.i. = 100) | a.i.=the percent age by mass of the surfactant-containing material as charged to the reaction vessel that is not diluent oil.

r.i.=percentage by mass of "reactive ingredient", that is, percentage of the surfactant as charged to the reaction vessel that, in the liquid overbased detergent, is associated with calcium.

(it will be appreciated that the term "active ingredient" has its normal meaning, and refers to that portion of the surfactant-containing material which comprises molecules other than diluent oil molecules. We have found that, when using surfactants to prepare overbased detergents in accordance with the invention, in some cases a proportion of the surfactant molecules do not react with the basic calcium compound(s), and remain in unreacted, non-salt, form in the liquid overbased detergent. In such cases, the percentage of "reactive ingredient" will be lower than the percentage of "active ingredient".)

2. In Table 2, Ph %, Sulph %, Sal % and Carbox % are the percentages by mass of the phenol surfactant, sulphonic acid surfactant, salicylic acid surfactant and carboxylic acid

What is claimed is:

1. A method of manufacturing a calcium overbased detergent having a surfactant system derived from at least two surfactants, which method comprises:
   (A) treating with an overbasing agent a mixture comprising (a), (b) and (c) in the presence of water and without the use of inorganic halides or ammonium salts, wherein
      (a) is selected from the group consisting of (a1) and (a2) and mixtures thereof:
         (a1) at least two surfactants, at least one of the surfactants being a sulphurized or non-sulphurized phenol and at least one other of the surfactants being a surfactant other than a phenol surfactant, wherein the mass ratios of the components are such that the proportion of phenol surfactant in the surfactant system of the overbased detergent is at least 15 mass %;
         (a2) at least two surfactants, at least one of the surfactants being a sulphurized or non-sulphurized salicylic acid and at least one other of the surfactants being a surfactant other than a salicylic acid surfactant;

(b) calcium hydroxide; and
(c) oil, the treatment with the overbasing agent being carried out at less than 100° C.;

(B) optionally subjecting the product of (A) to a heat-soaking step;

(C) adding a further quantity of basic calcium compound(s) to the product of (B), and treating the mixture so obtained with an overbasing agent, the said treatment being carried out at less than 100° C.; and (D) optionally subjecting the product of (C) to a heat-soaking step:

the mass ratios of all the components being such as to produce an overbased detergent having a TBN of at least 300.

2. A method as claimed in claim 1, carried out without the use of a halide or a material capable of releasing a halide ion.

3. A method as claimed in claim 1, wherein in step (A) the said treatment is effected at a temperature of at least 15° C.

4. A method as claimed in claim 1, wherein in step (A) the said treatment is effected at a temperature of less than 80° C.

5. A method as claimed in claim 1, wherein in step (B) heat-soaking is carried out at a temperature in the range of from 15° C. to just below the reflux temperature of the reaction mixture.

6. A method as claimed in claim 1, wherein in step (C) the said treatment with overbasing agent is effected at a temperature of at least 15° C.

7. A method as claimed in claim 1, wherein in step (C) the said treatment with overbasing agent is effected at a temperature of less than 80° C.

8. A method as claimed in claim 1, wherein in step (D) heat-soaking is carried out at a temperature in the range of from 15° C. to just below the reflux temperature of the reaction mixture.

9. A method as claimed in claim 1, wherein the overbasing agent in step (A) comprises at least one of carbon dioxide and boric acid.

10. A method as claimed in claim 1, wherein the overbasing agent in step (C) comprises at least one of carbon dioxide and boric acid.

11. A method as claimed in claim 1, wherein steps (A) to (D) are carried out in the presence of a solvent selected from methanol, toluene, and mixtures thereof.

12. A method as claimed in claim 11, wherein toluene is used, and is present in such an amount that the percentage by mass of toluene, based on the calcium overbased detergent (excluding oil) is at least 1.5.

13. A method as claimed in claim 11, wherein methanol is used, and is present in such an amount that the percentage by mass of methanol, based on the calcium overbased detergent (excluding oil) is at least 1.5.

14. A method as claimed in claim 1, wherein steps (A) to (D) are carried out in the presence of a methanol co-promoter.

15. A method as claimed in claim 1, wherein water is used in such an amount that the percentage by mass of water, based on the initial charge of basic calcium compound(s) is at least 0.1.

16. A method as claimed in claim 1, wherein step (D) is followed by at least one further step, (E), comprising addition of basic calcium compound(s) and treatment of the mixture so obtained with an overbasing agent, the treatment with the overbasing agent optionally being followed by a heat-soaking step.

17. A method as claimed in claim 1, wherein the mass ratios of the components are such that the overbased detergent has a TBN of at least 330.

18. A method as claimed in claim 1, wherein the mass ratios of the components are such that the overbased detergent has a standardized TBN of at least 450.

19. A method as claimed in claim 1, carried out such that the overbased detergent has a viscosity at 40° C. of at most 20,000 mm$^2$/s.

20. A method as claimed in claim 1, carried out such that the overbased detergent has a viscosity at 100° C. of at most 2000 mm$^2$/s.

21. A method as claimed in claim 1, wherein component (a) comprises at least one phenol surfactant and at least one salicylic acid surfactant.

22. A method as claimed in claim 1, wherein the phenol is an alkyl-substituted phenol.

23. A method as claimed in claim 21, wherein the salicylic acid is an alkyl-substituted salicylic acid.

24. A method as claimed in claim 21, wherein the mass ratios of the components are such that the proportion of salicylic acid surfactant in the surfactant system of the overbased detergent is at least 15 mass %.

25. A method as claimed in claim 23, wherein at least one of the surfactants from which the surfactant system of the overbased detergent is derived is a sulphonic acid.

26. A method as claimed in claim 25, wherein the sulphonic acid is an alkyl-substituted aryl sulphonic acid.

27. A method as claimed in claim 25, wherein the surfactant system is derived from at least one phenol surfactant and at least one sulphonic acid surfactant and the total proportion of the said phenol and the said sulphonic acid in the surfactant system of the overbased detergent is at least 75 mass %.

28. A method as claimed in claim 25, wherein the surfactant system is derived from at least one sulphurized phenol and at least one sulphonic acid, the proportions of phenol to sulphonic acid in the surfactant system being in the range of from 15:85 to 95:5 mass %.

29. A method as claimed in claim 25, wherein at least one of the surfactants from which the surfactant system is derived is a carboxylic acid.

30. A method as claimed in claim 29, wherein the carboxylic acid is other than (a) an acid of the formula $R^a$—CH($R^b$)—COOH, wherein $R^a$ represents an alkyl or alkenyl group containing 10 to 24 carbon atoms and $R^b$ represents hydrogen, an alkyl group with 1 to 4 carbon atoms, or a $CH_2COOH$ group and (b) a di- or polycarboxylic acid containing from 36 to 100 carbon atoms.

31. A method as claimed in claim 29, wherein the carboxylic acid or a derivative thereof has 8 to 11 carbon atoms in the carboxylic-containing moiety.

32. A method as claimed in claim 29, wherein the surfactant system is derived from at least one phenol surfactant, at least one sulphonic acid surfactant and at least one carboxylic acid surfactant and the total proportion of the said phenol, the said sulphonic acid and the said carboxylic acid in the surfactant system of the overbased detergent is at least 75 mass %.

33. A method as claimed in claim 29, wherein the surfactant system is derived from at least one sulphurized phenol, at least one sulphonic acid and at least one carboxylic acid, the proportions of phenol to sulphonic acid to carboxylic acid in the surfactant system being in the range of from 5 to 90:5 to 90:5 to 90 mass %.

34. A method as claimed in claim 25, wherein the total proportion, measured as described herein, of the said phenol, the said salicylic acid and the said sulphonic acid in the surfactant system of the overbased detergent is at least 75 mass %.

35. A method as claimed in claim 34, wherein the surfactant system is derived from at least one sulphurized phenol, at least one salicylic acid and at least one sulphonic acid, the proportions of phenol to sulphonic acid to carboxylic acid in the surfactant system being in the range of from 5 to 90:5 to 90:20 to 80 mass %.

36. A method as claimed in claim 1, carried out without the use of dihydric alcohols.

* * * * *